(12) United States Patent
Lee et al.

(10) Patent No.: US 7,898,997 B2
(45) Date of Patent: Mar. 1, 2011

(54) APPARATUS AND METHOD FOR MEASURING NEIGHBOR CELL SIGNAL IN PORTABLE TERMINAL

(75) Inventors: Beom-Yong Lee, Yongin-si (KR); Chang-Ho Sohn, Seongnam-si (KR); Yong-Suk Moon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 733 days.

(21) Appl. No.: 11/874,564

(22) Filed: Oct. 18, 2007

(65) Prior Publication Data

US 2008/0107019 A1    May 8, 2008

(30) Foreign Application Priority Data

Nov. 3, 2006  (KR) .................. 10-2006-0108262

(51) Int. Cl.
  *H04Q 7/22* (2006.01)
  *G08C 17/00* (2006.01)
  *H04B 7/212* (2006.01)
(52) U.S. Cl. .............. 370/311; 370/337; 455/436; 455/443; 375/356
(58) Field of Classification Search .......... 370/229, 370/230.1, 332, 337, 350, 519; 375/356; 455/436, 439, 442, 443, 502, 67.13, 67.16
  See application file for complete search history.

(56) References Cited

U.S. PATENT DOCUMENTS 5,363,376 A * 11/1994 Chuang et al. .............. 370/332

6,141,554 A * 10/2000 Choi .......................... 455/436
2005/0271009 A1* 12/2005 Shirakabe et al. ........... 370/329

FOREIGN PATENT DOCUMENTS

| JP | 2000-224646 | 8/2000 |
|---|---|---|
| KR | 100265584 | 6/2000 |
| WO | WO 2004/021731 | 3/2004 |

(Continued)

OTHER PUBLICATIONS

"Universal Mobile Telecommunications System (UMTS); User Euipment (UE) Procedures in Idle Mode and Procedures for Cell Reselection in Connected Mode (3GPP TS 25.304 version 7.0.0 Release 7); ETSI TS 125 304", ETSI Standards, Mar. 1, 2006.

(Continued)

*Primary Examiner*—Afsar M. Qureshi
(74) *Attorney, Agent, or Firm*—The Farrell Law Firm, LLP

(57) ABSTRACT

Provided is a method for measuring a neighbor cell signal in a portable terminal includes acquiring a minimum required quality level value and a threshold for an intra-frequency measurement from received system information; calculating a measured cell quality value after the acquiring step; and commencing a neighbor cell signal measurement for an intra-frequency cell reselection when a value acquired by subtracting the minimum required quality level value from the measured cell quality value is less than or equal to a value acquired by adding the threshold and a certain signal strength value over a certain time. In the neighbor cell signal measurement for the cell reselection, the unnecessary neighbor cell signal measurement can be avoided to reduce the power consumption and extend the battery lifetime.

10 Claims, 6 Drawing Sheets

FOREIGN PATENT DOCUMENTS

WO    WO 2004/040935    5/2004

OTHER PUBLICATIONS

Flore et al.: "Cell Reselection Parameter Optimization in UMTS", Wireless Communication Systems, Sep. 5, 2005.

Garavaglia et al.: "Inter-System Cell Reselection Parameter Optimization in UMTS", 2005 IEEE 16th International Symposium on Personal, Indoor and Mobile Radio Communications, Sep. 11, 2005.

* cited by examiner

```
CELLSELECTRESELECTINFO
{
        CELLSELECTQUALITYMEASURE CPICH-EC-NO :
        {
        },
                MODESPECIFICINFO FDD :
                {
                        S-INTRASEARCH 3,
                        RAT-LIST
                        {
                                {
                                        RAT-IDENTIFIER GSM,
                                        S-SEARCHRAT 2,
                                        S-HCS-RAT  -53,
                                        S-LIMIT-SEARCHRAT 0
                                }
                        },
                        Q-QUALMIN -18,
                        Q-RXLEVMIN -58
                },
        Q-HYST-I-S 2,
        T-RESELECTION-S 2,
        MAXALLOWEDUL -TX-POWER 24
}
```

FIG.1
(PRIOR ART)

APPARATUS AND METHOD FOR MEASURING NEIGHBOR CELL SIGNAL IN PORTABLE TERMINAL

PRIORITY

This application claims priority under 35 U.S.C. §119(a) to a Korean Patent Application filed in the Korean Intellectual Property Office on Nov. 3, 2006 and assigned Serial No. 2006-108262, the contents of which are herein incorporated by reference.

BACKGROUND OF THE INVENTION

1. Field of the Invention

The present invention relates generally to a neighbor cell signal measurement, and in particular, to an apparatus and method for avoiding an unnecessary neighbor cell signal measurement due to a signal change caused by a temporary condition change.

2. Description of the Related Art

The Universal Mobile Telecommunications System (UMTS), which is the third-generation (3G) mobile communication system in Europe, has been providing its commercial services in many countries over the world and the number of subscribers to this service is increasing. The UMTS, which is standardized by the 3$^{rd}$ Generation Partnership Project (3GPP), can more efficiently provide high-speed data/multimedia service than the existing second-generation (2G) mobile communication system and provide an international roaming function available in any place.

The 2G system, Global System for Mobile communications (GSM), has been provided in European countries from the early 1990s. Currently, almost every country in Europe and the United States is providing stable 2G service over nationwide networks.

The UMTS system is serviceable in major cities across the Europe and is expanding its coverage. Since a seamless handover is feasible between the UMTS system and the GSM, a UMTS subscriber can enjoy voice and packet services in any place.

When migrating from one cell of the 3G mobile communication system (the UMTS) to another cell, a terminal performs an intra-frequency or inter-frequency cell reselection. When migrating to a region having no UMTS cell, the terminal performs the cell reselection to a cell of the 2G mobile communication system (the GSM).

The three cell reselection conditions are defined in the standard specification. When the signal level difference between the current serving cell and the other cell meets a certain condition, the cell reselection to the other cell is carried out. Parameters required for the cell reselection are carried by system information (specifically, System Information Block (SIB) 3) broadcast to terminals over the network. The signal measurement conditions for those three cell reselections are shown in Table 1.

TABLE 1

| Type | Signal strength | |
|---|---|---|
| Intra Cell Reselection | Squal > Sintrasearch => UE need not perform intra-frequency measurement | Squal <= Sintrasearch => UE perform intra-frequency measurement |
| | If Sintrasearch is not sent for serving cell, perform intra-frequency measurements. | |

TABLE 1-continued

| Type | Signal strength | |
|---|---|---|
| Inter Cell Reselection | Squal > Sintersearch => UE need not perform inter-frequency measurement | Squal <= Sintersearch => UE perform inter-frequency measurement |
| | If Sintersearch is not sent for serving cell, perform inter-frequency measurements. | |
| Inter.RAT Cell Reselection | Squal > Ssearch.RAT(GSM) => UE need not perform measurement on cells of RAT(GSM) | Squal <= Ssearch.RAT(GSM) => UE perform measurement on cells of RAT(GSM) |
| | If Ssearch.RAT(GSM) is no sent for serving cell, perform measurement on cells of RAT(GSM) Squal = Qqualmeas − Qqualmin. | |

"Qqualmeas" is a measured cell quality value and is calculated in Common Pilot CHannel (CPICH) Energy per chip to Noise ratio (Ec/No) or CPICH Received Signal Code Power (RSCP). "Qqualmin" is a minimum required quality level; that is, a minimum value. "Squal" is a cell selection quality value.

"Sintrasearch" is a threshold for the intra-frequency measurement, "Sintersearch" is a threshold for the inter-frequency measurement, and "Ssearch.RAT(GSM)" is a threshold for inter-Radio Access Technology (RAT) frequency measurement. "Qqualmin", "Sintrasearch", "Sintersearch", and "Ssearch.RAT(GSM)" are delivered to the terminal by the system information (SIB3). When "Sintrasearch" ("Sintersearch" or "Ssearch.RAT(GSM)" is greater than "Squal", the current specification describes that the terminal performs the cell reselection.

FIG. 1 illustrates a conventional algorithm for the neighbor cell signal measurement.

Specifically, FIG. 1 shows part of an SIB3 parameter of a Vodafone D2 network.

When satisfying the condition of Table 2, the German Vodafone D2 network commences the neighbor cell signal measurement for the intra-frequency cell reselection and the inter-RAT cell reselection.

TABLE 2

| Case | Content |
|---|---|
| Intra frequency case | CPICH Ec/No − (−18) <= 3 => CPICH Ec/No <= −15 dB |
| Inter-RAT case | CPICH Ec/No − (−18) <= 2 => CPICH Ec/No <= −16 dB |

When CPICH Ec/No value is less than or equal to −15 dB or −16 dB, the neighbor cell signal measurement for the intra-frequency cell reselection and the inter-RAT cell reselection starts.

Once the signal level of CPICH Ec/No or CPICH RSCP of the current serving cell meets a certain condition, the conventional technique starts the neighbor cell signal measurement. In this case, although the terminal does not travel in the boundary of the current cell, when the received signal level meets the condition for the cell reselection owing to a temporary obstacle around the terminal, the neighbor cell signal measurement commences. However, if the obstacle disappears, the received signal level is regained and thus there is no need to measure the neighbor cell signal.

In other words, when the temporary obstacle causes the temporary decrease of the received signal level though the terminal does not travel in the cell boundary, the unnecessary neighbor cell signal measurement commences.

SUMMARY OF THE INVENTION

An aspect of the present invention is to substantially solve at least the above problems and/or disadvantages and to provide at least the advantages below. Accordingly, an aspect of the present invention is to provide an apparatus and method for measuring a neighbor cell signal in a portable terminal.

Another aspect of the present invention is to provide an apparatus and method for avoiding an unnecessary neighbor cell signal measurement caused by the signal strength change owing to the instant condition change in a portable terminal.

A further aspect of the present invention is to provide an apparatus and method for extending a battery lifetime by avoiding an unnecessary neighbor cell signal measurement in a portable terminal.

The above aspects are achieved by providing a method for measuring a neighbor cell signal in a portable terminal, which includes acquiring a minimum required quality level value and a threshold for an intra-frequency measurement from received system information; calculating a measured cell quality value after the acquiring step; and when a value acquired by subtracting the minimum required quality level value from the measured cell quality value is less than or equal to a value acquired by adding the threshold and a certain signal strength value over a certain time, commencing a neighbor cell signal measurement for an intra-frequency cell reselection.

According to one aspect of the present invention, a method for measuring a neighbor cell signal in a portable terminal includes acquiring a minimum required quality level value and a threshold for an inter-frequency measurement from received system information; calculating a measured cell quality value after the acquiring step; and when a value acquired by subtracting the minimum required quality level value from the measured cell quality value is less than or equal to a value acquired by adding the threshold and a certain signal strength value over a certain time, commencing a neighbor cell signal measurement for an inter-frequency cell reselection.

According to another aspect of the present invention, a method for measuring a neighbor cell signal in a portable terminal includes acquiring a minimum required quality level value and a threshold for an inter-Radio Access Technology (RAT) measurement from received system information; calculating a measured cell quality value after the acquiring step; and when a value acquired by subtracting the minimum required quality level value from the measured cell quality value is less than or equal to a value acquired by adding the threshold and a certain signal strength value over a certain time, commencing a neighbor cell signal measurement for an inter-RAT cell reselection.

According to a further aspect of the present invention, an apparatus for measuring a neighbor cell signal in a portable terminal includes an interface module for processing and providing a signal received on an antenna, and processing and transmitting a fed signal on the antenna to communicate with other node; and a signal measurer for acquiring a minimum required quality level value and a threshold for an intra-frequency measurement from system information received through the interface module, calculating a measured cell quality value, and when a value acquired by subtracting the minimum required quality level value from the measured cell quality value is less than or equal to a value acquired by adding the threshold and a certain signal strength value over a certain time, commencing a neighbor cell signal measurement for an intra-frequency cell reselection.

BRIEF DESCRIPTION OF THE DRAWINGS

The above and other objects, features and advantages of the present invention will become more apparent from the following detailed description when taken in conjunction with the accompanying drawings in which:

FIG. 1 illustrates a conventional algorithm for a neighbor cell signal measurement;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for measuring a neighbor cell signal in a portable terminal.

Figure 2:
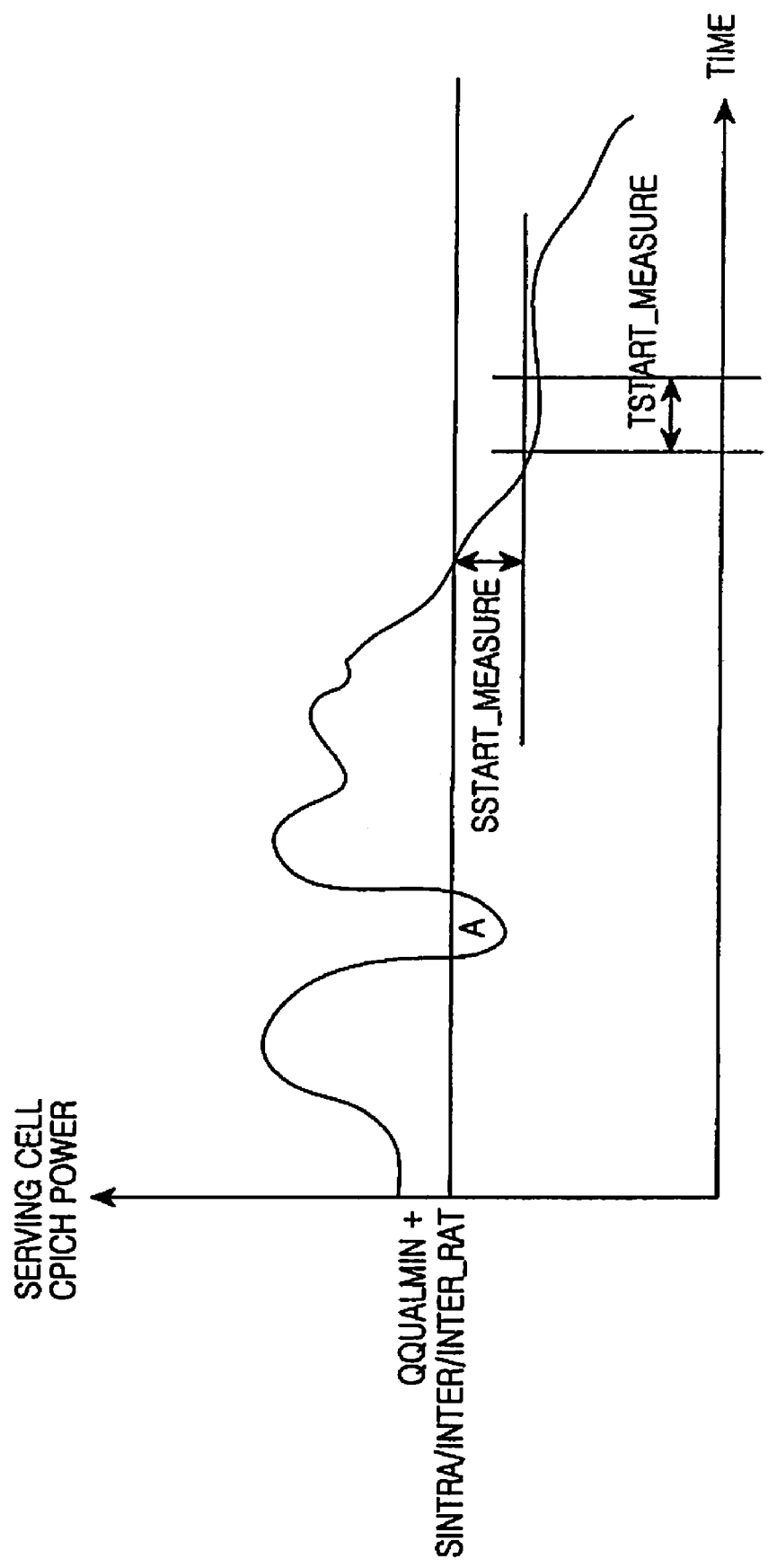
FIG. 2 illustrates relations between variables defined for the neighbor cell signal measurement according to the present invention, a signal, and a time.

FIG. 2 illustrates relations between variables defined for the neighbor cell signal measurement according to the present invention, a signal, and a time.

In FIG. 2, two parameters are added to the conventional cell reselection algorithm. The two parameters are a signal strength value "Tstart_measure" and a time value (timer) "Sstart_measure".

As indicated by "A", when CIPCH Ec/No or CPICH RSCP value of the serving cell temporarily falls and a measurement start condition for the cell reselection is satisfied, the conventional algorithm commences the neighbor cell signal measurement immediately. In this situation, although a terminal does not travel in the cell boundary, the neighbor cell signal is measured and thus the power is unnecessarily consumed. To prevent this, even when the CIPCH Ec/No or CPICH RSCP value received at the terminal satisfies the measurement start condition for the current cell reselection, the measurement is not performed right away. To avoid the neighbor cell signal measurement owing to the temporary condition, the neighbor cell signal is measured when the CPICH Ec/No or CPICH RSCP value is maintained by "Sstart_measure" during "Tstart_measure" time.

Figure 3:
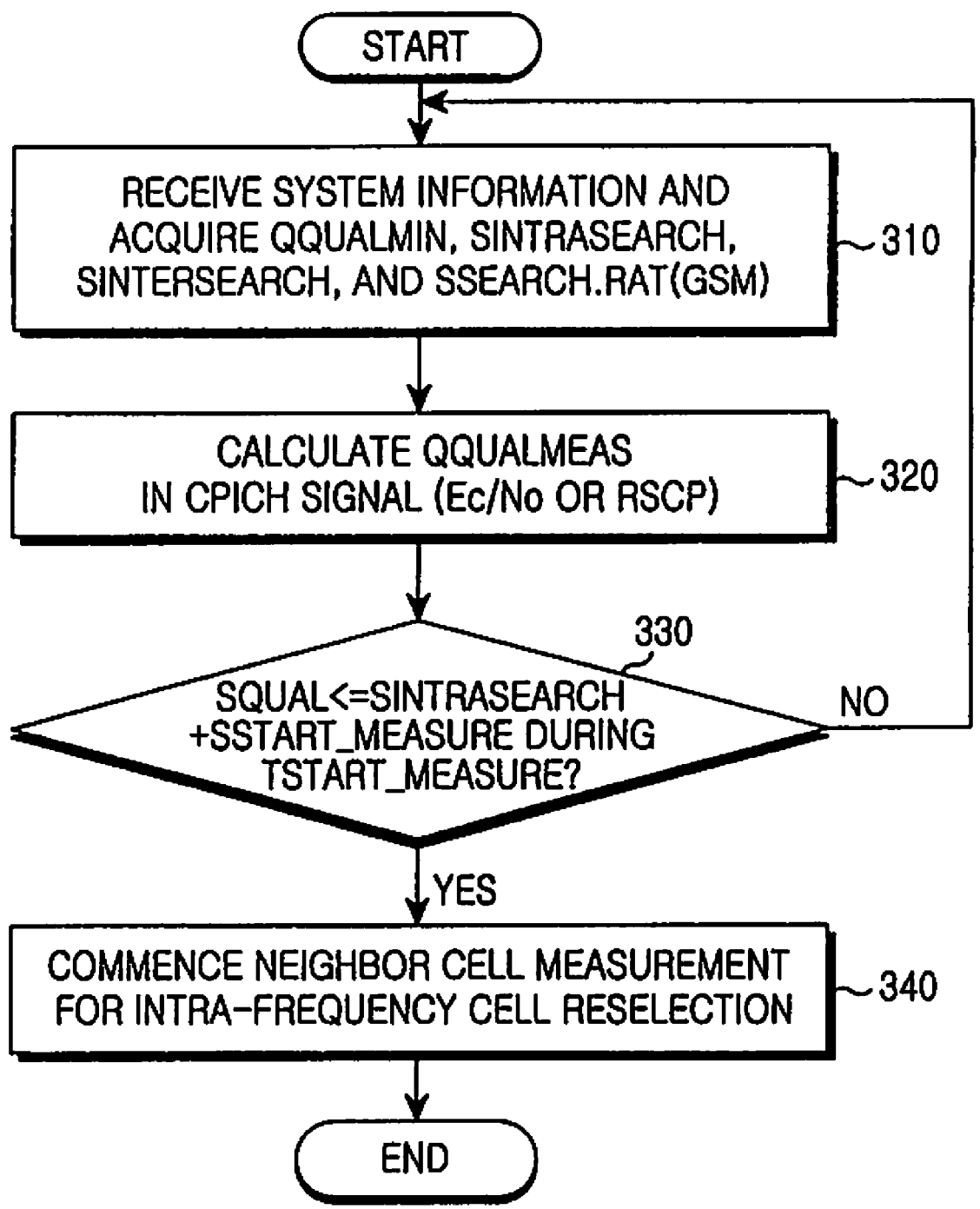
FIG. 3 is a flowchart of an intra-frequency neighbor cell measurement method according to the present invention.

FIG. 3 is a flowchart of an intra-frequency neighbor cell measurement method according to the present invention.

Referring to FIG. 3, a terminal receives system information and obtains "Qqualmin", "Sintrasearch", "Sintersearch", and "Ssearch.RAT(GSM)" in step 310.

The terminal calculates "Qqualmeas" in CPICH Ec/No or CIPCH RSCP in step 320.

When "Squal" value is less than or equal to "Sintrasearch+ Sstart_measure" during "Tstart_measure" time in step 330, the terminal starts to measure the network cell for the intra-frequency cell reselection in step 340. The "Squal" value can be acquired by subtracting "Qqualmin" from "Qqualmeas".

Next, the terminal terminates this process.

Figure 4:
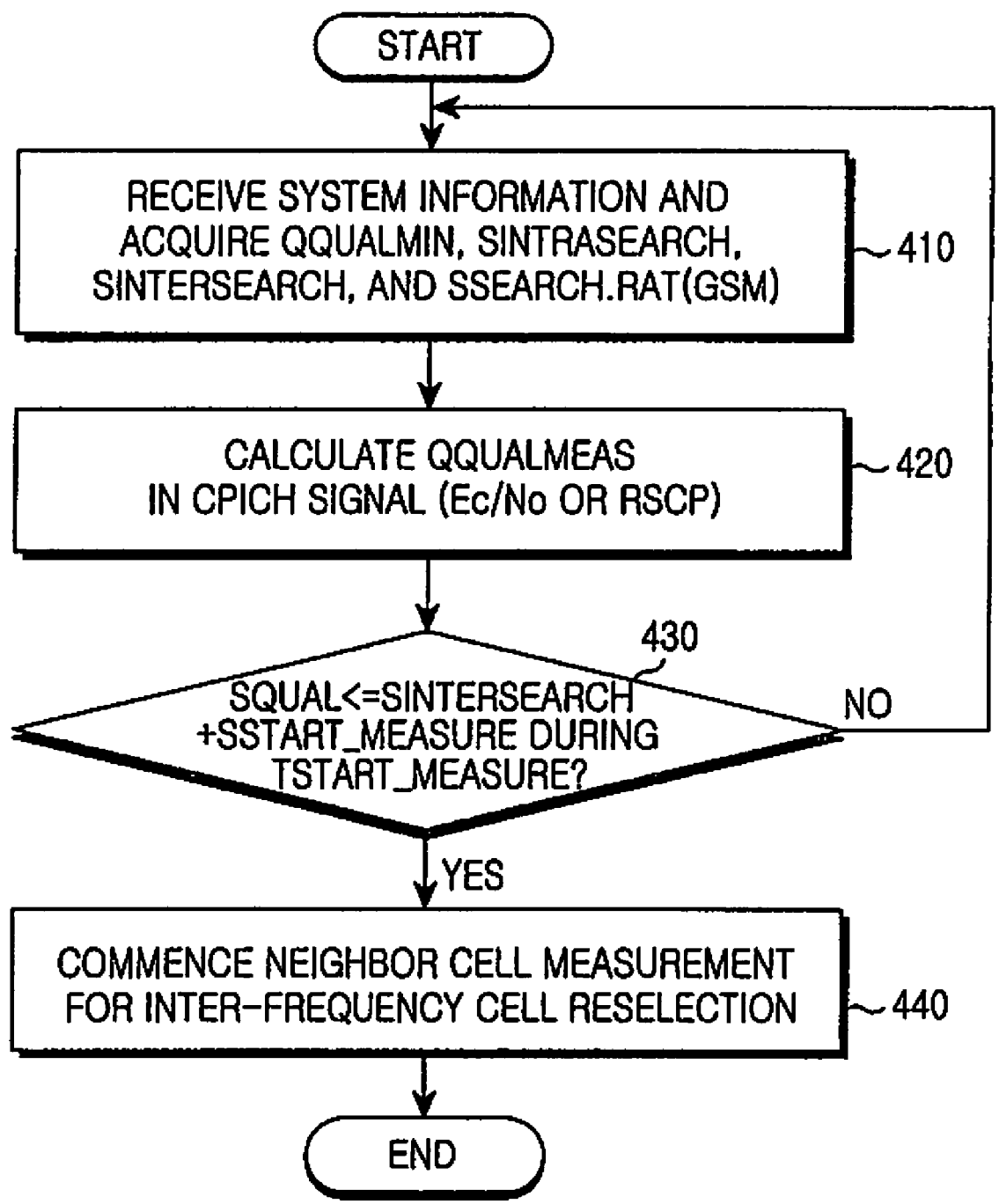
FIG. 4 is a flowchart of an inter-frequency neighbor cell measurement method according to the present invention.

FIG. 4 is a flowchart of an inter-frequency neighbor cell measurement method according to the present invention.

Referring to FIG. 4, the terminal receives system information and obtains "Qqualmin", "Sintrasearch", "Sintersearch", and "Ssearch.RAT(GSM)" in step 410.

The terminal calculates "Qqualmeas" in CPICH Ec/No or CPICH RSCP in step 420.

When "Squal" value is less than or equal to "Sintersearch+Sstart_measure" during "Tstart_measure" time in step 430, the terminal starts to measure the network cell for the inter-frequency cell reselection in step 440. The "Squal" value can be acquired by subtracting "Qqualmin" from "Qqualmeas".

Next, the terminal terminates this process.

Figure 5:
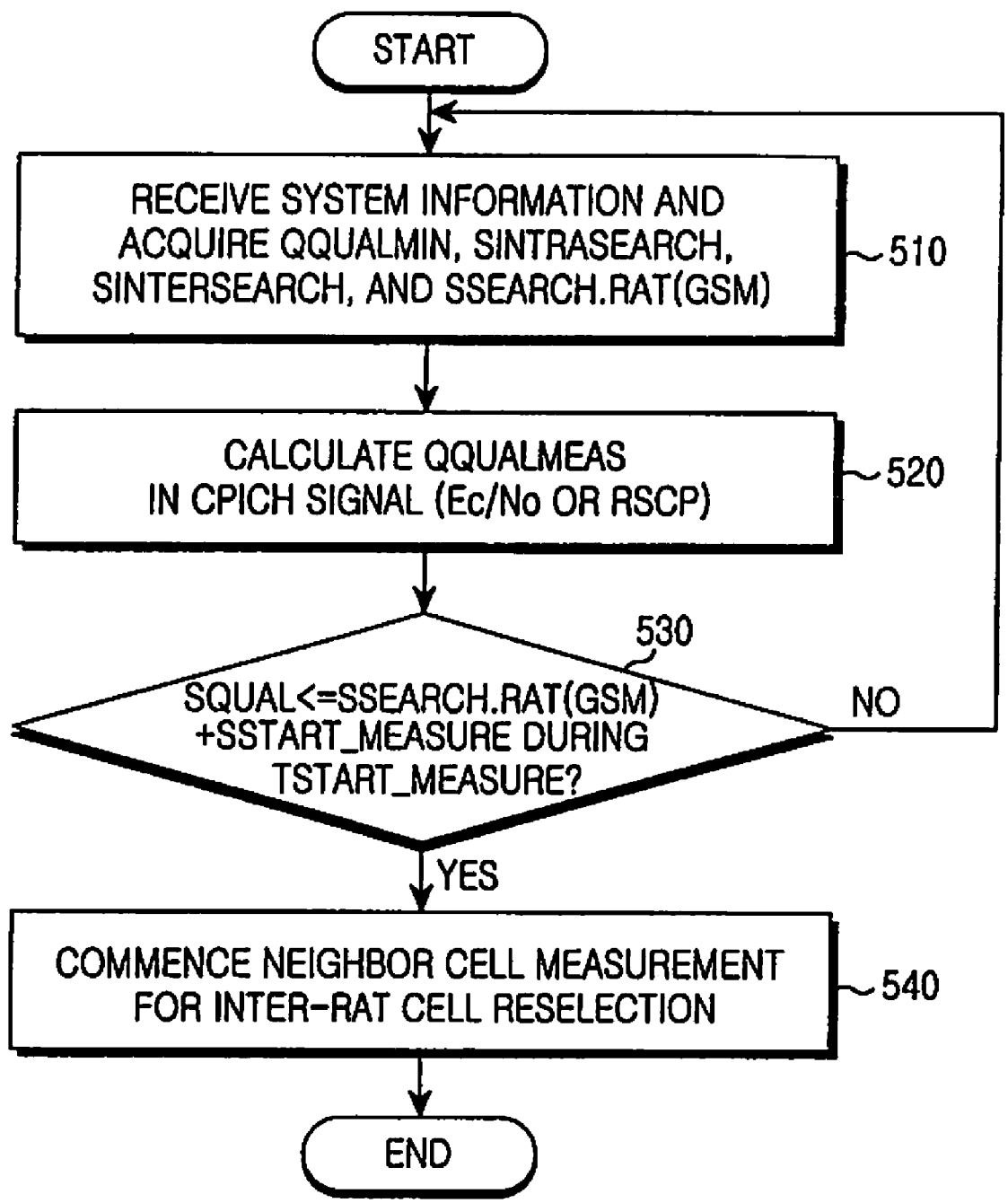
FIG. 5 is a flowchart of an inter-RAT neighbor cell measurement method according to the present invention.

FIG. 5 is a flowchart of an inter-Radio Access Technology (RAT) neighbor cell measurement method according to the present invention.

Referring to FIG. 5, the terminal receives system information and acquires "Qqualmin", "Sintrasearch", "Sintersearch", and "Ssearch.RAT(GSM)" in step 510.

The terminal calculates "Qqualmeas" in CPICH Ec/No or CPICH RSCP in step 520.

When "Squal" value is less than or equal to "Ssearch.RAT (GSM) +Sstart_measure" during "Tstart_measure" time in step 530, the terminal starts to measure the network cell for the inter-RAT cell reselection in step 540. The "Squal" value can be acquired by subtracting "Qqualmin" from "Qqualmeas".

Next, the terminal terminates this process.

Figure 6:
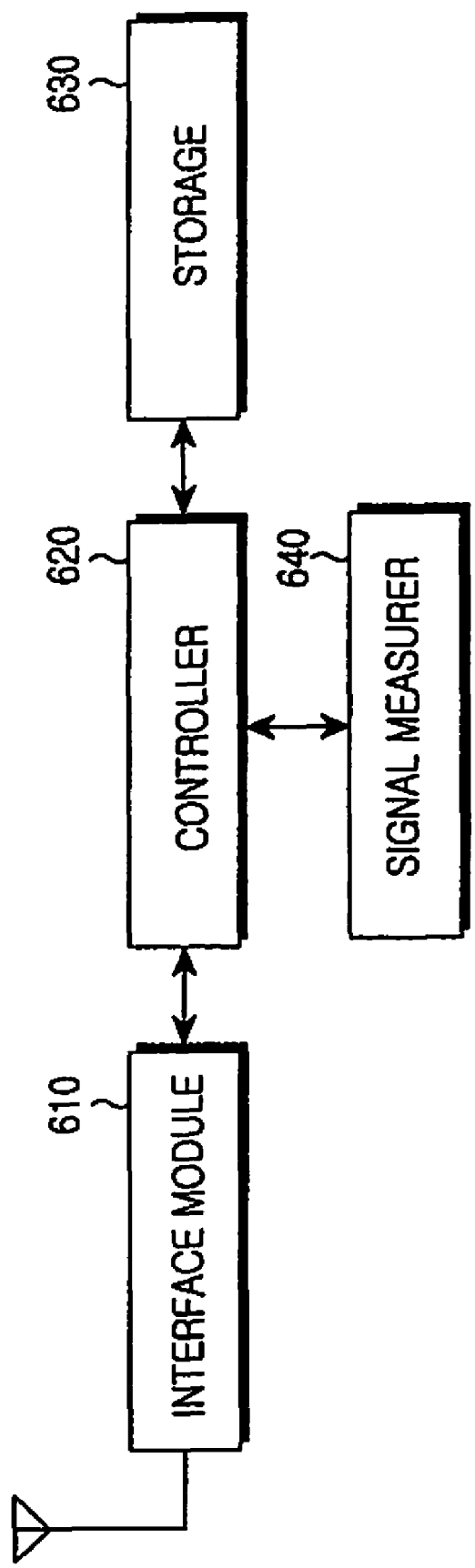
FIG. 6 is a block diagram of a portable terminal according to the present invention.

FIG. 6 is a block diagram of a portable terminal according to the present invention.

An interface module 610 in FIG. 6 communicates with other node and includes a Radio Frequency (RF) processor, a baseband processor, etc. The RF processor converts a signal received over an antenna to a baseband signal and provides the baseband signal to the baseband processor, converts a baseband signal fed from the baseband processor to an RF signal to be sent over the air and transmits the RF signal on the antenna.

A controller 620 controls an overall operation of the portable terminal. For instance, the controller 620 processes and controls voice calls and data communication. In addition to the typical functions, the controller 620 controls a signal measurer 640 to measure a neighbor cell signal for a cell reselection, receives the measurement result, and performs the cell reselection according to the result.

According to the direction and the information from the controller 620, the signal measurer 640 commences the neighbor cell measurement for the inter-RAT cell reselection when "Squal" value is less than or equal to "Ssearch.RAT (GSM)+Sstart_measure" during "Tstart_measure", commences the neighbor cell measurement for the inter-frequency cell reselection when "Squal" value is less than or equal to "Sintersearch+Sstart_measure" during "Tstart_measure", and commences the neighbor cell measurement for the intra-frequency cell reselection when "Squal" value is less than or equal to "Sintersearch+Sstart_measure" during "Tstart_measure". Next, the signal measurer 640 provides the measurement result to the controller 620.

A storage 630 stores programs for controlling the overall operation of the portable terminal and temporary data generated during program executions.

As constructed above, the controller 620 can function as the signal measurer 640. According to the present invention, the controller 620 and the signal measurer 640 are separately provided to distinguish their functions. In the actual implementation, the controller 620 may process all or part of the functions of the signal measurer 640.

In the neighbor cell signal measurement for the cell reselection, the unnecessary neighbor cell signal measurement can be avoided to thus reduce the power consumption and extend the battery lifetime. Also, even when the terminal migrates to the cell boundary, the time point of the cell reselection can be deferred to thereby expand the cell coverage.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for measuring a neighbor cell signal in a portable terminal, the method comprising:
    acquiring a minimum required quality level value and a threshold for an intra-frequency measurement from received system information;
    calculating a measured cell quality value after the acquiring step; and
    when a value acquired by subtracting the minimum required quality level value from the measured cell quality value is less than or equal to a value acquired by adding the threshold and a certain signal strength value over a certain time, commencing a neighbor cell signal measurement for an intra-frequency cell reselection.

2. The method of claim 1, further comprising:
    when the value acquired by subtracting the minimum required quality level value from the measured cell quality value is greater than the value acquired by adding the threshold and the certain signal strength value over the certain time, not commencing the neighbor cell signal measurement for the intra-frequency cell selection.

3. A method for measuring a neighbor cell signal in a portable terminal, the method comprising:
    acquiring a minimum required quality level value and a threshold for an inter-frequency measurement from received system information;
    calculating a measured cell quality value after the acquiring step; and
    when a value acquired by subtracting the minimum required quality level value from the measured cell quality value is less than or equal to a value acquired by adding the threshold and a certain signal strength value over a certain time, commencing a neighbor cell signal measurement for an inter-frequency cell reselection.

4. The method of claim 3, further comprising:
    when the value acquired by subtracting the minimum required quality level value from the measured cell quality value is greater than the value acquired by adding the threshold and the certain signal strength value over the certain time, not commencing the neighbor cell signal measurement for the inter-frequency cell selection.

5. A method for measuring a neighbor cell signal in a portable terminal, the method comprising:
    acquiring a minimum required quality level value and a threshold for an inter-Radio Access Technology (RAT) measurement from received system information;
    calculating a measured cell quality value after the acquiring step; and
    when a value acquired by subtracting the minimum required quality level value from the measured cell quality value is less than or equal to a value acquired by adding the threshold and a certain signal strength value over a certain time, commencing a neighbor cell signal measurement for an inter-RAT cell reselection.

6. The method of claim 5, further comprising:
when the value acquired by subtracting the minimum required quality level value from the measured cell quality value is greater than the value acquired by adding the threshold and the certain signal strength value over the certain time, not commencing the neighbor cell signal measurement for the inter-RAT cell selection.

7. An apparatus for measuring a neighbor cell signal in a portable terminal, comprising:
an interface module for processing and providing a signal received on an antenna, and processing and transmitting a fed signal on the antenna to communicate with other node; and
a signal measurer for acquiring a minimum required quality level value and a threshold for an intra-frequency measurement from system information received through the interface module, calculating a measured cell quality value, and, when a value acquired by subtracting the minimum required quality level value from the measured cell quality value is less than or equal to a value acquired by adding the threshold and a certain signal strength value over a certain time, commencing a neighbor cell signal measurement for an intra-frequency cell reselection.

8. The apparatus of claim 7, wherein the signal measurer acquires a minimum required quality level value and a threshold for an inter-frequency measurement from system information received through the interface module, calculates a measured cell quality value, and, when a value acquired by subtracting the minimum required quality level value from the measured cell quality value is less than or equal to a value acquired by adding the threshold and a certain signal strength value over a certain time, commences a neighbor cell signal measurement for an inter-frequency cell reselection.

9. The apparatus of claim 7, wherein the signal measurer acquires a minimum required quality level value and a threshold for an inter-Radio Access Technology (RAT) measurement from system information received through the interface module, calculates a measured cell quality value, and, when a value acquired by subtracting the minimum required quality level value from the measured cell quality value is less than or equal to a value acquired by adding the threshold and a certain signal strength value over a certain time, commences a neighbor cell signal measurement for an inter-RAT cell reselection.

10. An apparatus for measuring a neighbor cell signal in a portable terminal, comprising:
means for acquiring a minimum required quality level value and a threshold for an intra-frequency measurement from received system information;
means for, after acquiring the minimum required quality level value and the threshold, calculating a measured cell quality value; and
means for commencing a neighbor cell signal measurement for an intra-frequency cell reselection when a value acquired by subtracting the minimum required quality level value from the measured cell quality value is less than or equal to a value acquired by adding the threshold and a certain signal strength value over a certain time.

* * * * *